United States Patent
Hadlich et al.

(10) Patent No.: US 8,233,115 B2
(45) Date of Patent: Jul. 31, 2012

(54) FLAT PANEL DISPLAY ASSEMBLY WITH IMPROVED LUMINANCE UNIFORMITY AND METHOD FOR CONSTRUCTING THE SAME

(75) Inventors: Daniel Hadlich, Albuquerque, NM (US); Eric Irving, Albuquerque, NM (US); Mike Thorson, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 12/180,109

(22) Filed: Jul. 25, 2008

(65) Prior Publication Data

US 2010/0020266 A1     Jan. 28, 2010

(51) Int. Cl.
G02F 1/1335     (2006.01)

(52) U.S. Cl. ............ 349/64; 349/56; 349/61; 349/112

(58) Field of Classification Search .......... 349/64, 349/56, 57, 58, 61, 62, 112
See application file for complete search history.

(56) References Cited

U.S. PATENT DOCUMENTS

| | | | |
|---|---|---|---|
| 6,568,822 B2 | 5/2003 | Boyd et al. | |
| 6,676,284 B1 | 1/2004 | Wynne Willson | |
| 6,805,468 B2 | 10/2004 | Itoh et al. | |
| 6,883,934 B2 | 4/2005 | Kawakami et al. | |
| 6,974,229 B2 | 12/2005 | West et al. | |
| 7,004,611 B2 | 2/2006 | Parker et al. | |
| 7,104,672 B2 | 9/2006 | Zhang | |
| 7,118,236 B2 | 10/2006 | Hahm et al. | |
| 7,153,000 B2 | 12/2006 | Park et al. | |
| 7,153,009 B2 | 12/2006 | Tatsukawa et al. | |
| 7,168,819 B2 | 1/2007 | Yen | |
| 7,229,199 B2 | 6/2007 | Lee et al. | |
| 7,255,458 B2 | 8/2007 | Ashdown | |
| 7,273,299 B2 | 9/2007 | Parkyn et al. | |
| 7,287,891 B1 | 10/2007 | Park et al. | |
| 7,316,496 B2 | 1/2008 | Wu et al. | |
| 7,320,531 B2 | 1/2008 | West et al. | |
| 7,348,723 B2 | 3/2008 | Yamaguchi et al. | |
| 7,661,864 B2 * | 2/2010 | Kohara et al. | 362/606 |
| 2005/0007516 A1 * | 1/2005 | Hong et al. | 349/64 |
| 2006/0221271 A1 * | 10/2006 | Tsai | 349/64 |

* cited by examiner

*Primary Examiner* — Brian M. Healy
*Assistant Examiner* — Mary El Shammaa
(74) *Attorney, Agent, or Firm* — Ingrassia Fisher & Lorenz, P.C.

(57) ABSTRACT

A flat panel display assembly and a method for constructing a flat panel display assembly are provided. The flat panel display assembly includes a substrate, a plurality of light emitting components mounted to the substrate, at least one diffusion component having concave and convex opposing surfaces. Each of the diffusion components is coupled to the substrate such that the concave surface thereof is between at least some of the plurality of light emitting components and the convex surface thereof. The at least one diffusion component is configured to diffuse light emitted from the at least some of the plurality of light emitting components as the light propagates therethough. A diffusion layer is coupled to the substrate such that the convex surface of each of the at least one diffusion component is between the concave surface thereof and the diffusion layer and configured to further diffuse the light that propagates through the at least one diffusion component.

20 Claims, 7 Drawing Sheets

FLAT PANEL DISPLAY ASSEMBLY WITH IMPROVED LUMINANCE UNIFORMITY AND METHOD FOR CONSTRUCTING THE SAME

GOVERNMENT RIGHTS

This invention was made with Government support under Contract F42620-01-D-0058-SC01, awarded by the United States Air Force. The Government has certain rights in this invention.

TECHNICAL FIELD

The present invention generally relates to display devices, and more particularly relates to a flat panel display assembly with improved luminance uniformity.

BACKGROUND

In recent years, liquid crystal displays (LCDs), and other flat panel display devices, have become increasingly popular as mechanisms for displaying information to operators of vehicles, such as aircraft. One of the reasons for this is that LCDs are capable of providing very bright and clear images that are easily seen by the user, even in high ambient light situations, such as daytime flight.

Such flat panel display devices are often illuminated by backlights that include multiple relatively small, almost "point source," light emitting components, such as light emitting diodes (LEDs). In order to evenly illuminate the LCD in a direct view configuration, often a gap is left between the LEDs and the LCD panel, which allows the light from the LEDs to spread out, or diffuse, before entering the LCD. Additionally, a diffuser is often installed in the device between the LEDs and the LCD and is made of a translucent material that further diffuses the light as it passes therethrough. However, even when used in combination, the gap and the diffuser either do not optimize luminance uniformity or cause the device to be undesirably sized.

Accordingly, it is desirable to provide a flat panel display assembly and method for constructing such an assembly that maximizes luminance uniformity while maintaining a desirable size. Furthermore, other desirable features and characteristics of the present invention will become apparent from the subsequent detailed description and the appended claims, taken in conjunction with the accompanying drawings and the foregoing technical field and background.

BRIEF SUMMARY

In one embodiment, a flat panel display assembly is provided. The flat panel display assembly includes a substrate, a plurality of light emitting components mounted to the substrate, at least one diffusion component having concave and convex opposing surfaces, each being coupled to the substrate such that the concave surface thereof is between at least some of the plurality of light emitting components and the convex surface thereof, wherein the at least one diffusion component is configured to diffuse light emitted from the at least some of the plurality of light emitting components as the light propagates therethough, and a diffusion layer coupled to the substrate such that the convex surface of each of the at least one diffusion component is between the concave surface thereof and the diffusion layer and configured to further diffuse the light that propagates through the at least one diffusion component.

In another embodiment, a flat panel display assembly is provided. The flat panel display assembly includes a substrate, a plurality of light emitting components mounted to the substrate, a plurality of diffusion components having concave and convex opposing surfaces, each being coupled to the substrate such that the concave surface thereof is between at least one of the plurality of light emitting components and the convex surface thereof, wherein the plurality of diffusion components are configured to diffuse light emitted from the at least one of the plurality of light emitting components as the light propagates therethough, and a diffusion layer coupled to the substrate such that the convex surface of each of the plurality of diffusion components is between the concave surface thereof and the diffusion layer and configured to further diffuse the light that propagates through the plurality of diffusion components.

In a further embodiment, a liquid crystal display (LCD) assembly is provided. The LCD assembly includes a printed circuit board (PCB), a plurality of light emitting diodes (LEDs) mounted to the PCB, a plurality of diffusion components having concave and convex opposing surfaces, each being coupled to the PCB such that the concave surface thereof is between at least one of the LEDs and the convex surface thereof, wherein the plurality of diffusion components are configured to diffuse light emitted from the at least one of the plurality of light emitting components as the light propagates therethough, and a diffusion layer coupled to the PCB such that the convex surface of each of the plurality of diffusion components is between the concave surface thereof and the diffusion layer and configured to further diffuse the light that propagates through the plurality of diffusion components, and an LCD panel located on a side of the diffusion layer opposite the plurality of LEDs and being configured to generate an image with the light after propagating through the diffusion layer.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-7 are merely illustrative and may not be drawn to scale.

FIG. 1 to FIG. 7 illustrate a flat panel display assembly and a method for constructing a flat panel display system. The flat panel display assembly includes a substrate (e.g., a printed circuit board (PCB)), a plurality of light emitting components (e.g., light emitting diodes (LEDs)) mounted to the substrate, at least one diffusion component having concave and convex opposing surfaces. Each of the diffusion components are coupled to the substrate such that the concave surface thereof is between at least some of the plurality of light emitting components and the convex surface thereof and configured to diffuse light emitted from the at least some of the plurality of light emitting components as the light propagates therethough. A diffusion layer is coupled to the substrate such that the convex surface of each of the at least one diffusion component is between the concave surface thereof and the diffusion layer and configured to further diffuse the light that propagates through the at least one diffusion component.

Figure 1:
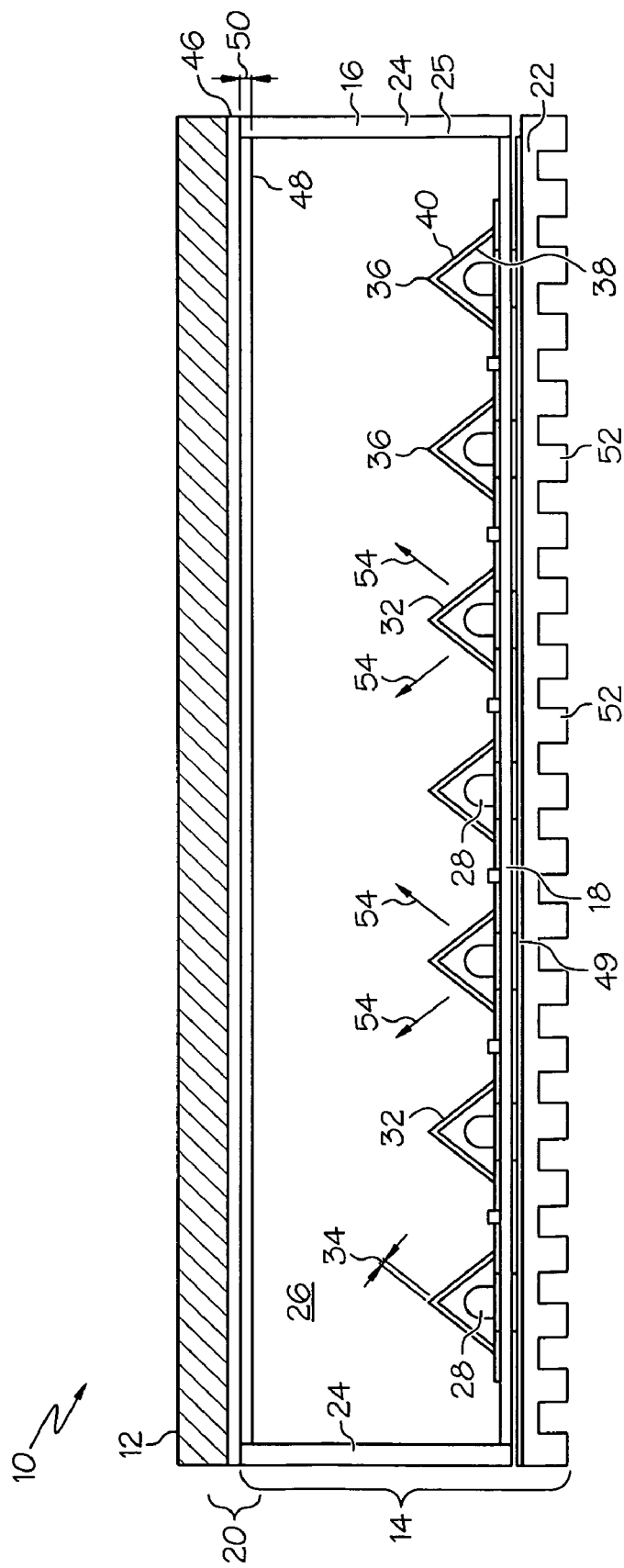
FIG. 1 is sectional view of a flat panel display system, according to one embodiment of the present invention.

FIG. 1 illustrates a flat panel display (or LCD) assembly 10, according to one embodiment of the present invention. The flat panel display assembly 10 includes an imaging device 12 and a backlight assembly 14.

In one embodiment, the imaging device 12 is an LCD panel, as is commonly understood. Although not shown in detail, the LCD panel may be a thin film transistor (TFT) LCD panel and may include, for example, a lower substrate made of glass with a plurality of TFTs formed thereon. The TFTs may include a plurality of gate electrodes (i.e., row lines), including a plurality of rows of electrodes, and source electrodes (i.e., column lines), including a plurality of columns of electrodes, interconnecting respective rows and columns of the transistors. The gate and source electrodes may divide the lower substrate into a plurality of display pixels, as is commonly understood. The LCD panel may also include an upper substrate (also made of glass) that includes a common electrode a lower portion thereof, which may substantially extend across the upper substrate. A liquid crystal layer may be positioned between the lower substrate and the upper substrate and include a liquid crystal material suitable for use in an LCD display.

Still referring to FIG. 1, in the depicted embodiment, the backlight assembly 14 includes a housing 16, a substrate 18, a diffuser (or primary diffuser) 20, and a heat sink 22. Although only shown in a side view, the housing 16, may be substantially rectangular with side walls 24 extending around a cavity 26 that has openings at upper and lower portions thereof. The housing 16 may be made of any suitably rigid material, such as aluminum or a composite material. Although not shown, the housing 16 may be sized to accommodate various sizes of LCD panels 12 and substrates 18 (e.g., with side lengths of between 4 and 20 inches). It will also be appreciated by one skilled in the art, that the depth of the cavity 26 (as measured between the substrate 18 and the diffuser 20) may be varied by, for example, adjusting the height of the side wall 24 of the housing 16. In one embodiment, the side walls 24 include reflective coatings (e.g., reflective paint) or reflective materials (e.g., polytetrafluoroethylene (PTFE) or plastic) on inner sides 25 thereof.

As shown in FIG. 1, the substrate 18 is coupled to the housing 16 to extend across the cavity 26 at the lower portion thereof (i.e., at lower ends of the side walls 24). Referring now to FIG. 1 in combination with FIGS. 2 and 3, the substrate 18 is a printed circuit board (PCB) having a plurality of light emitting diodes (LEDs) 28 mounted thereto and arranged in a plurality of rows 30 (e.g., seven rows of five LEDs each). The PCB includes a substantially flat, planar member of an insulating material, such as an molded glass epoxy resin or composite material, and although not shown in detail, various conductive traces and electronic components and circuitry on the planar member to route power and control signals to the LEDs 28. In one embodiment, the LEDs 28 include red, green, and blue (RGB) LEDs, which may be used to form various other colors, as is commonly understood.

Figure 2:
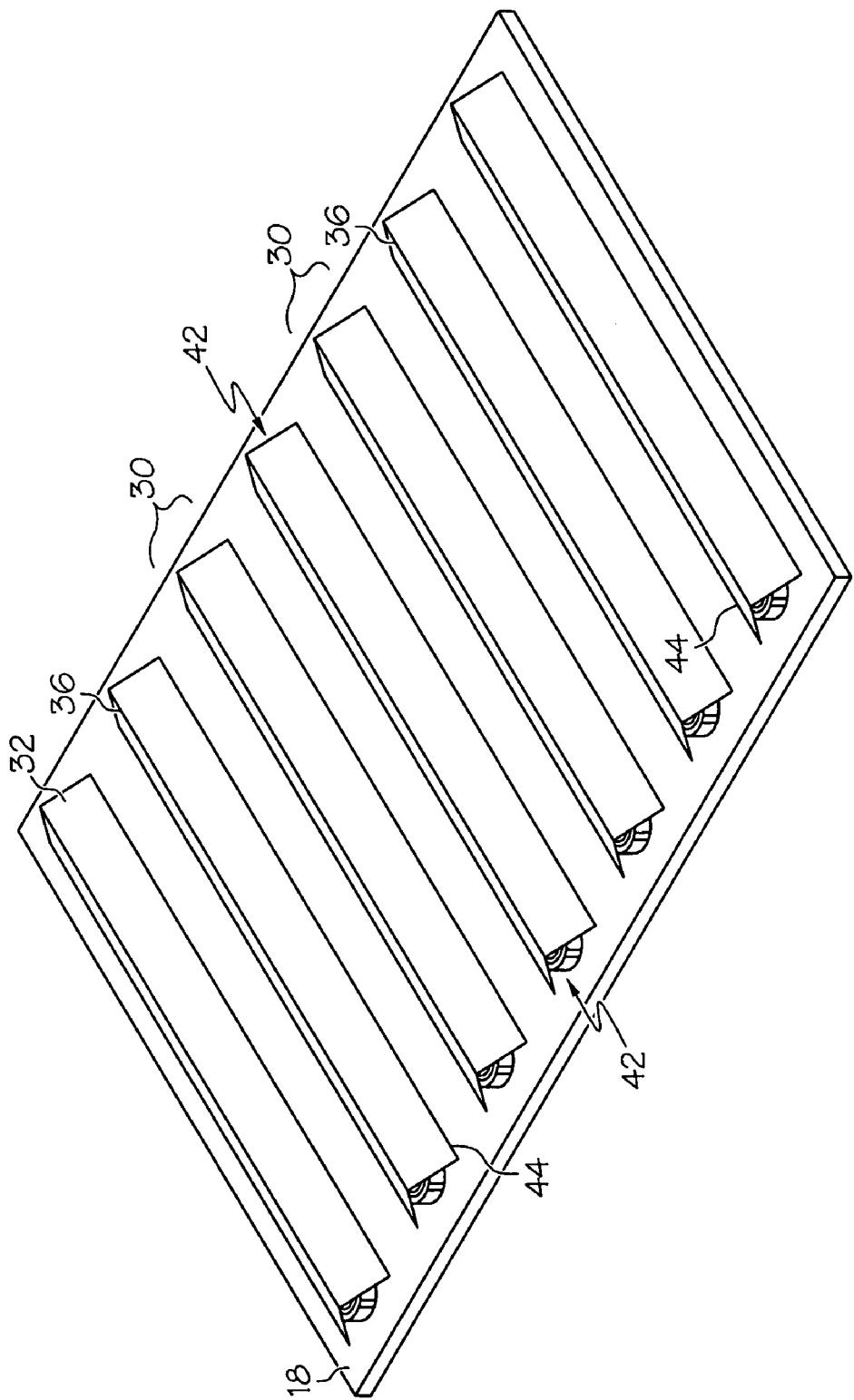
FIGS. 2 and 3 are isometric views of a substrate, including a plurality of light emitting components mounted thereto, within the flat panel display system of FIG. 1.
Figure 3:
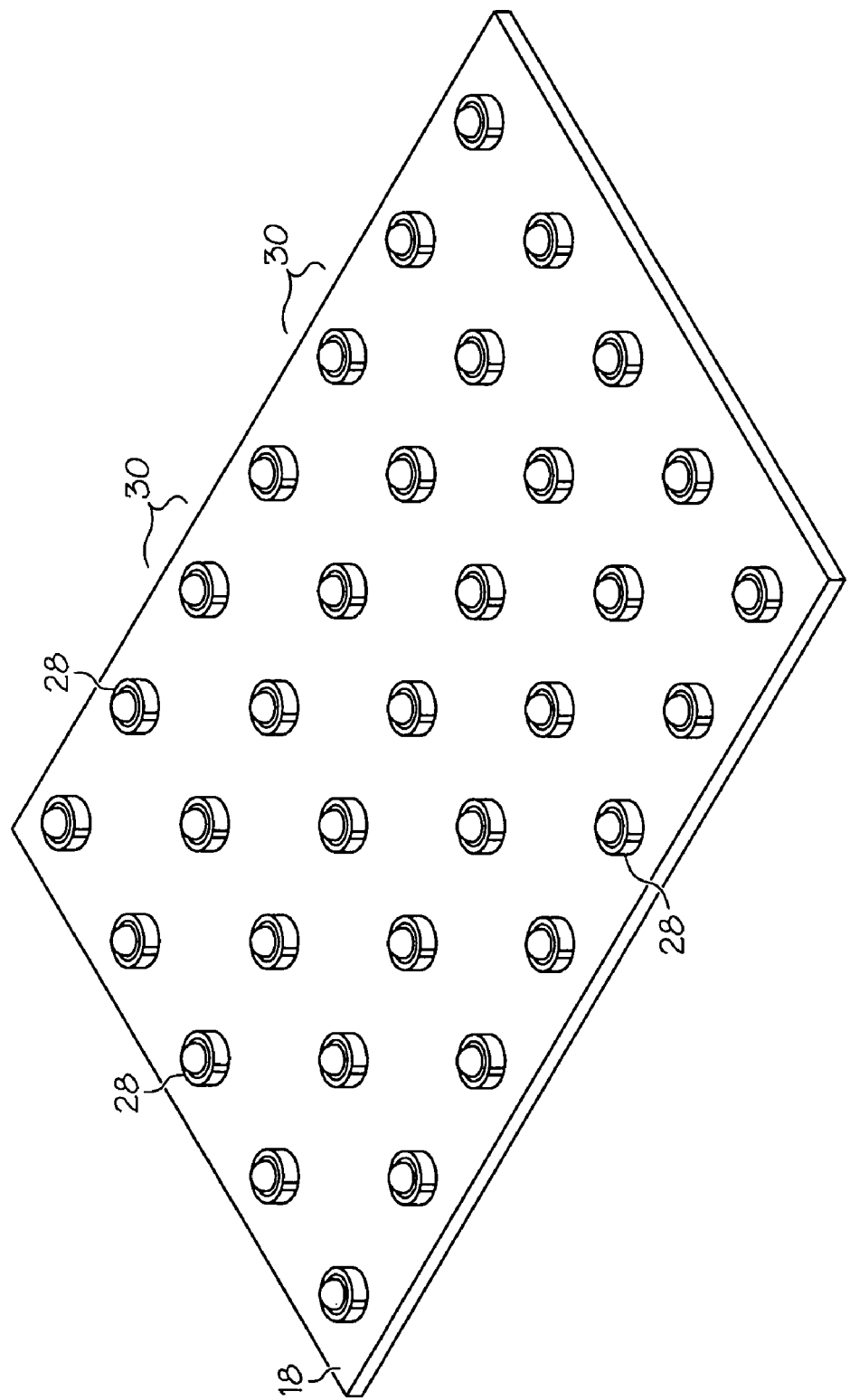

Still referring to FIGS. 1, 2, and 3, the substrate 18 also includes a plurality of diffusion components (or secondary diffusers) 32. In the depicted embodiment, the diffusion components 32 are substantially elongate members that are each positioned over a respective row 30 of LEDs 28. As is apparent, FIG. 3 illustrates the substrate 18 without the diffusion components 32 so that the rows 30 of LEDs 28 may be clearly seen. As specifically shown in FIGS. 1 and 2, the diffusion components 32 have a substantially uniform thickness 34 and include a bend (or crease) 36 that extends in a direction that is substantially parallel to the respective row 30 of LEDs 28. The bends 36 in the diffusion components 32 cause the diffusion components 32 to have concave sides 38 and convex sides 40 such that a canopy is formed over each row 30 of LEDs 28 with openings 42 at opposing ends of the rows 30 of LEDs 28. The diffusion components 32 are arranged on the substrate 18 such that the concave sides 38 the located between the LEDs 28 and the convex sides 40 thereof (i.e., the concave sides 38 are adjacent to or "face" the LEDs 28).

The diffusion components 32 may be attached to the substrate 18 along elongate sides 44 thereof using, for example, a suitable adhesive. It should be understood that in other embodiment, the diffusion components 32 may be held in place over the substrate 18 by being connected to other components, such as a frame. The diffusion components 32 are made of a translucent diffusion material that diffuses light as it propagates therethrough. In one embodiment, the diffusion components 32 are made of a flexible acrylic film with a thickness of, for example, between 100 micrometers (μm) and 1 millimeter (mm). Other suitable materials for use in the diffusion components include polycarbonates and polyesters.

As shown in FIG. 1, the diffuser 20 is coupled to the housing 16 to extend across the cavity 26 at the upper portion thereof (i.e., at upper ends of the side walls 24). In one embodiment, the diffuser 20 includes a diffuser plate 46 and a diffusion layer 48. The diffuser plate 46 may be, for example, a transparent, glass plate with a thickness of between 1 and 3 mm. The diffusion layer 48 is, for example, a translucent film attached to, or formed on, a lower side of the diffuser plate 46. In one embodiment, the diffusion layer 48 has a thickness 50 that is substantially the same as the thickness 34 of the diffusion components 32 and is made of the same material. That is, in one embodiment, the diffusion layer 48 is made from the same acrylic film that is used to form the diffusion components 32.

The heat sink 22 is coupled to an external surface of the substrate 18 (and/or the lower ends of the side walls 24) and may be in the form of any conventional structure that is used to dissipate heat, and as such, may be made of a relatively thermally conductive material, such as aluminum, copper, or a ceramic material. In the depicted embodiment, the heat sink 22 is a substantially planar member that includes a plurality of fins 52 to increase the surface area of the heat sink, and thus maximize heat dissipation. In an embodiment in which the heat sink 22 is metal, an electrically insulating material 49 may be provided between the heat sink 22 and the substrate 18.

Still referring to FIG. 1, during operation, power and control signals are sent to the LEDs 28 through the conductive traces and electronic components and circuitry on the substrate 18. Light generated by the LEDs 28 propagates upwards (as the assembly 10 is oriented in FIG. 1) to the diffusion components 32. Due to the light diffusing properties of the material in the diffusion components 32, the light is diffused and/or scattered as it propagates therethrough. The shape of the diffusion components 32 increases the diffusion of the light in directions away from the bend 36 in each of the diffusion components 32 (i.e., in directions indicated by arrows 54). Any of the light which propagates towards the side walls 24 of the housing 16 may be reflected back towards the center of the assembly 10 by the reflective surfaces on the inner sides 25 of the side walls 24. As the light propagates through the diffusion layer 48 of the diffuser 20 it is further diffused before entering the imaging device 12.

In an embodiment in which the imaging device 12 is an LCD panel, a voltage is applied across each pixel within the LCD panel that dictates the amount of movement, or twisting, exhibited by the liquid crystals located in the liquid crystal layer therein to control the amount of light which passes through the LCD panel. As such, the LCD panel modulates the light passing therethrough in such a way that information (e.g., in the form of text, symbols, and figures) is displayed to a user.

One advantage of the flat panel display assembly described above is that because the light emitted from the light emitting components is diffused before entering the diffuser (i.e., the primary diffuser), the uniformity of the light entering the imaging device is improved. As a result, the uniformity of the luminance of the image displayed by the imaging device is improved. This uniformity is further improved by the bent shape (i.e., the opposing concave and convex surfaces) of the diffusion components. Another advantage is that because the diffusion components are made of relatively simple components (i.e., with substantially uniform thicknesses), the manufacturing of the assembly is facilitated, while the overall manufacturing costs are minimized. The manufacturing costs may further be minimized by the fact that, at least in one embodiment, the diffusion components are made from the same material as the diffusion layer.

Figure 4:
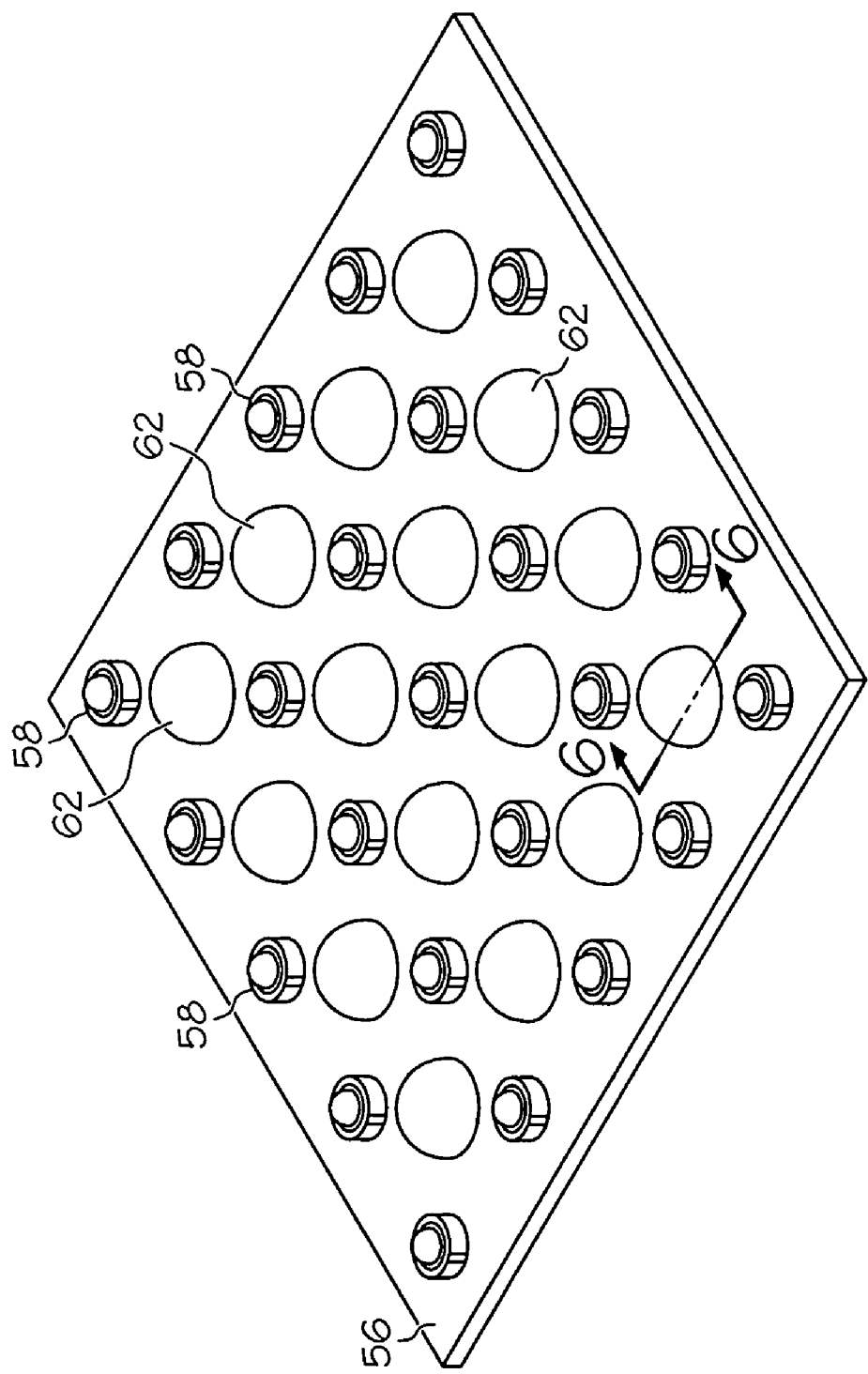
FIGS. 4 and 5 are isometric views of a substrate, including a plurality of light emitting components mounted thereto, according to another embodiment of the present invention.
Figure 5:
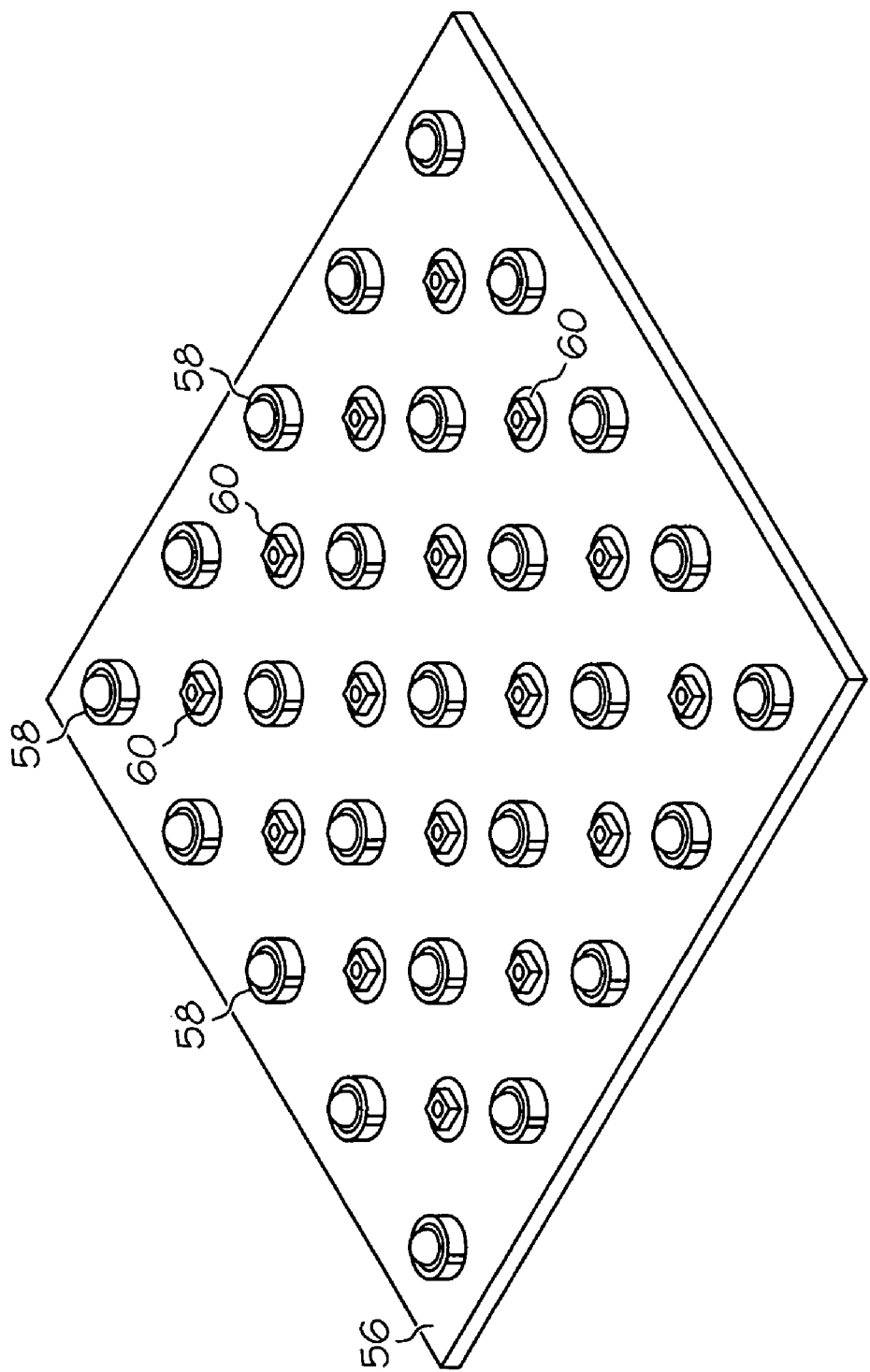
Figure 6:
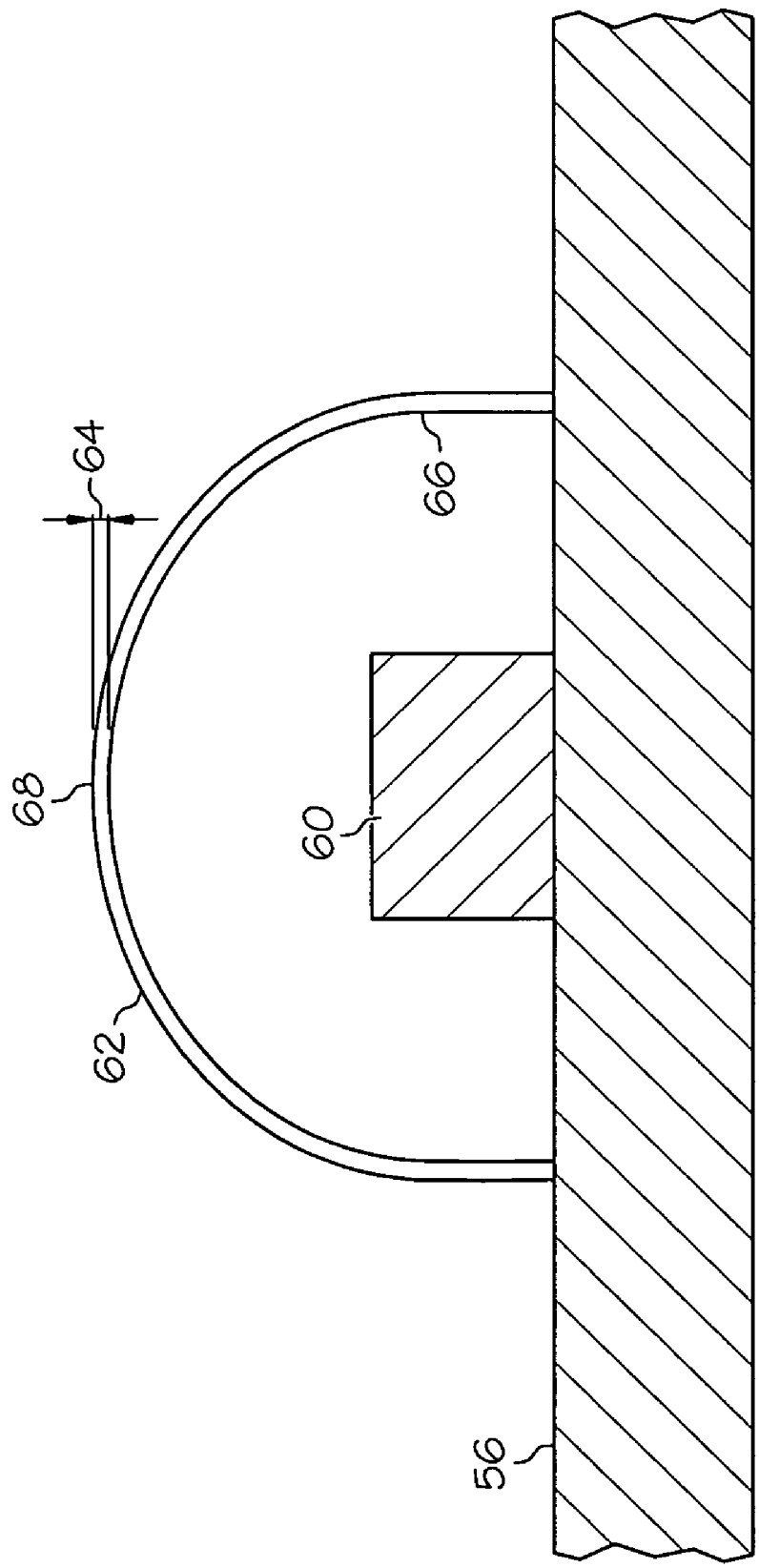
FIG. 6 is a cross-sectional side view of a portion of the substrate taken along line 6-6 in FIG. 4.

FIGS. 4, 5, and 6 illustrate a substrate (or PCB) 56 for use in a flat panel display assembly, according to another embodiment of the present invention. The substrate 56 includes a plurality of a first type of LEDs (i.e., first LEDs) 58, a plurality of a second type of LEDs (i.e., second LEDs) 60, and a plurality of diffusion components 62.

In one embodiment, the substrate 56 is intended to be used in a dual-mode flat panel display assembly, such in a Night Vision Imaging System (NVIS), which gives the user the ability to observe his or her environment in very low ambient light situations (i.e., perhaps in conjunction with a NVIS headset or goggles. As such, in a first mode of operation, for example, both the first and second LEDs 58 and 62 may be used, and in a second mode of operation, only one of the types of LEDs is used.

Referring specifically to FIG. 5 (in which the diffusion components 62 are not shown), in the depicted embodiment, the first LEDs 58 are arranged in five rows of five LEDs 58 each that substantially cover the entire substrate 56. The second LEDs 60 are arranged in four rows of four LEDs 60 each which cover a smaller, central portion of the substrate 56 compared to the first LEDs 58. As a result, in the depicted embodiment, each of the second LEDs 60 is positioned at center point of a "square" of four of the first LEDs 58.

Referring now to FIGS. 4, 5, and 6, the diffusion components 62 each cover one of the second LEDs 60 and are substantially domed-shaped. Similar to the diffusion components described above, the diffusion components 62 each have a substantially uniform thickness 64 and concave and convex opposing surfaces 66 and 68, with the concave surfaces 66 being adjacent to the second LEDs 60. The diffusion components 62 shown in FIGS. 4 and 6 may be made of similar materials to the diffusion components described above. It should be noted that the diffusion components 62 cover only the second LEDs 60 (i.e., the diffusion components 62 do not cover any of the first LEDs 58).

During operation, the substrate 56 may be utilized in a flat panel display similar to that shown in FIG. 1. The light emitted from the second LEDs (during either mode of operation) is initially diffused prior to entering the primary diffuser in order to maximize the uniformity of the image displayed by the imaging device. As will be appreciated by one skilled in the art, because the first LEDs 58 are spread over a greater portion of the substrate 56, the additional diffusion provided by the diffusion components 62 may not be desired. Thus, a further advantage of the embodiment shown in FIGS. 4, 5, and 6 is that because the diffusion components 62 cover only the LEDs that benefit most from the additional diffusion provided by the diffusion components, the manufacturing costs of the assembly may be even further minimized.

Other embodiments may utilize different numbers of sets of LEDs. For example, the PCB may include only a single type of LED with every LED having a filtering apparatus (e.g., an optical filter). The numbers and arrangements of the LEDs may be varied, as may the overall sizes and shapes of the assembly. Also, although the examples shown and described above is what could be considered to be an RGB LCD in a "stripe" configuration, it should be understood that other types of LCDs may also be used, such as monochrome LCD displays (e.g., a monochrome indicator unit or a head-up display (HUD)).

Figure 7:
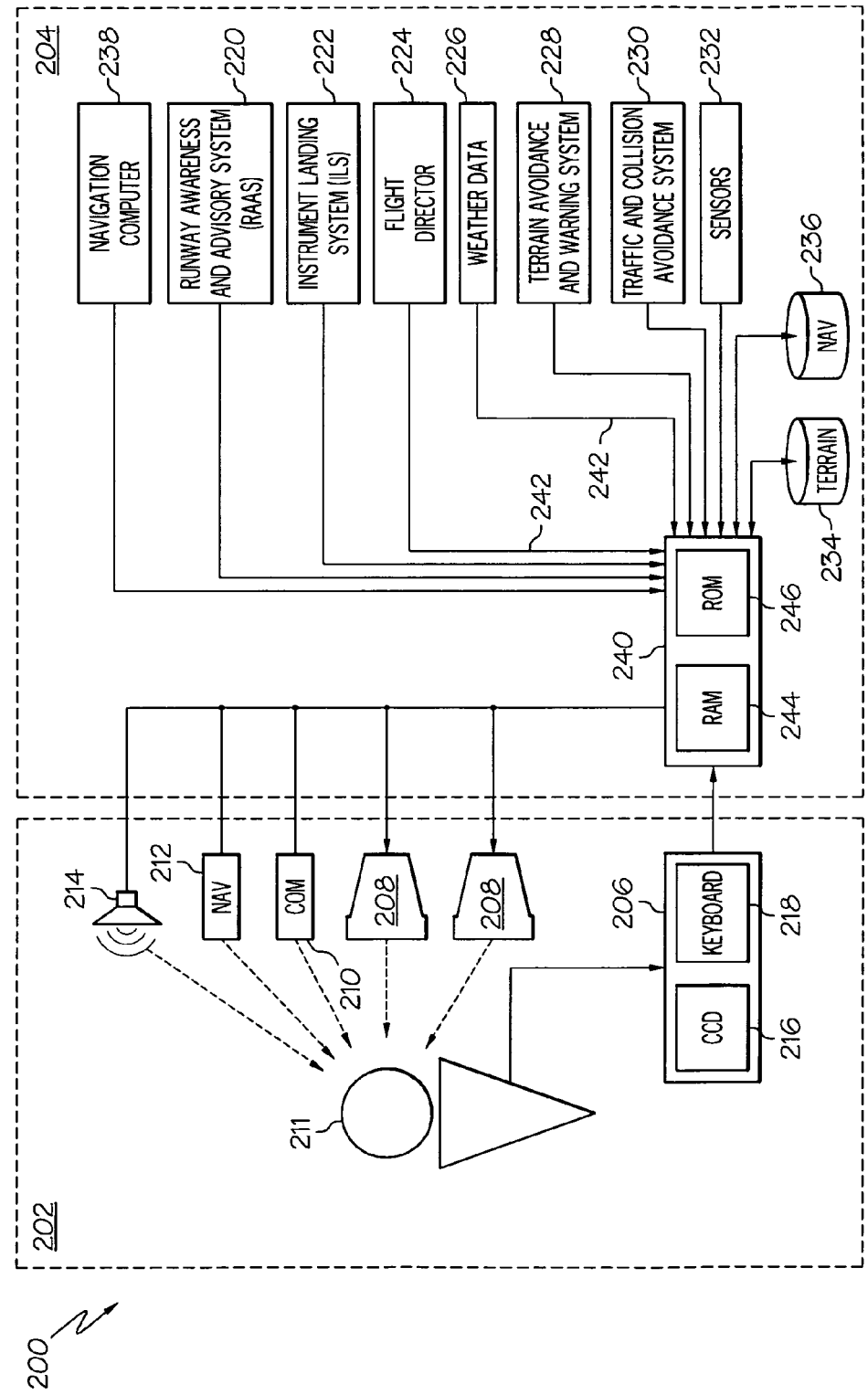
FIG. 7 is a block diagram schematically illustrating a vehicle including a flight deck and an avionics/flight system in which the flat panel display system of FIG. 1 may be implemented.

FIG. 7 schematically illustrates a vehicle 200, such as an aircraft, in which the flat panel display system 10 (FIG. 1) described above may be implemented, according to one embodiment of the present invention. The vehicle 200 may be, in one embodiment, any one of a number of different types of aircraft such as, for example, a private propeller or jet engine driven airplane, a commercial jet liner, or a helicopter. In the depicted embodiment, the vehicle 200 includes a flight deck 202 (or cockpit) and an avionics/flight system 204. Although not specifically illustrated, it should be understood that the vehicle 200 also includes a frame or body to which the flight deck 202 and the avionics/flight system 204 are connected, as is commonly understood. It should also be noted that vehicle 200 is merely exemplary and could be implemented without one or more of the depicted components, systems, and data sources. It will additionally be appreciated that the vehicle 200 could be implemented with one or more additional components, systems, or data sources. It should also be understood that the assemblies described above may be utilized in vehicles other than aircraft, such as manned ground vehicles with a closed cockpits (e.g. tank or armored personnel carrier) or an open vehicles such as a Humvee class vehicle. Further, the assemblies may be used in portable computing devices such as laptop computers and other similar mobile devices with LCD displays.

As shown in FIG. 7, the flight deck 202 includes a user interface 206, at least one display device 208 (e.g., a primary flight display (PFD), a communications radio 210, a navigational radio 212, and an audio device 214. The user interface 206 is configured to receive input from a user 211 (e.g., a pilot) and, in response to the user input, supply command signals to the avionics/flight system 204. The user interface 206 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 206 includes a CCD 216 and a keyboard 218. The user 211 uses the CCD 216 to, among other things, move a cursor symbol on the display devices 208, and may use the keyboard 218 to, among other things, input textual data.

Still referring to FIG. 1, the display devices 208, which may include the flat panel display system described above, are used to display various images and data, in graphic, iconic, and/or textual formats, and to supply visual feedback to the user 211 in response to user input commands supplied by the user 211 to the user interface 206.

The communication radio 210 is used, as is commonly understood, to communicate with entities outside the vehicle 200, such as air-traffic controllers and pilots of other aircraft. The navigational radio 212 is used to receive from outside sources and communicate to the user various types of information regarding the location of the vehicle, such as Global Positioning Satellite (GPS) system and Automatic Direction Finder (ADF) (as described below). The audio device 214 is, in one embodiment, an audio speaker mounted within the flight deck 202.

The avionics/flight system 204 includes a runway awareness and advisory system (RAAS) 220, an instrument landing system (ILS) 222, a flight director 224, a weather data source 226, a terrain avoidance warning system (TAWS) 228, a traffic and collision avoidance system (TCAS) 230, a plurality of sensors 232, one or more terrain databases 234, one or more navigation databases 236, a navigation and control system 238, and a processor 240. The various components of the avionics/flight system 204 are in operable communication via a data bus 242 (or avionics bus).

The RAAS 220 provides improved situational awareness to help lower the probability of runway incursions by providing timely aural advisories to the flight crew during taxi, takeoff, final approach, landing and rollout. The ILS 222 is a radio navigation system that provides aircraft with horizontal and vertical guidance just before and during landing and, at certain fixed points, indicates the distance to the reference point of landing. The flight director 224, as is generally known, supplies command data representative of commands for piloting the aircraft in response to flight crew entered data, or various inertial and avionics data received from external systems. The weather data source 226 provides data representative of at least the location and type of various weather cells. The TAWS 228 supplies data representative of the location of terrain that may be a threat to the aircraft, and the TCAS 230 supplies data representative of other aircraft in the vicinity, which may include, for example, speed, direction, altitude, and altitude trend. Although not illustrated, the sensors 232 may include, for example, a barometric pressure sensor, a thermometer, and a wind speed sensor.

The terrain databases 234 include various types of data representative of the terrain over which the aircraft may fly, and the navigation databases 236 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

Although not illustrated, the navigation and control system 238 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear). The processor 240 may be any one of numerous known general-purpose microprocessors or an application specific processor that operates in response to program instructions. In the depicted embodiment, the processor 240 includes on-board RAM (random access memory) 244 and on-board ROM (read only memory) 246. The program instructions that control the processor 240 may be stored in either or both the RAM 244 and the ROM 246. For example, the operating system software may be stored in the ROM 246, whereas various operating mode software routines and various operational parameters may be stored in the RAM 244. It will be appreciated that this is merely exemplary of one scheme for storing operating system software and software routines, and that various other storage schemes may be implemented. It will also be appreciated that the processor 240 may be implemented using various other circuits, not just a programmable processor. For example, digital logic circuits and analog signal processing circuits could also be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A flat panel display assembly comprising:
a substrate;
a plurality of light emitting components mounted to the substrate;
at least one diffusion component coupled to the substrate having a concave lower surface and an opposing convex upper surface such that the concave lower surface thereof is between at least some of the plurality of light emitting components and the opposing convex upper surface thereof, wherein the at least one diffusion component is configured to diffuse light emitted from the at least some of the plurality of light emitting components as the light propagates therethough; and
a diffusion layer coupled to the substrate such that the convex upper surface of each of the at least one diffusion component is between the concave lower surface thereof and the diffusion layer and configured to further diffuse the light that propagates through the at least one diffusion component.

2. The flat panel display assembly of claim 1, wherein the at least one diffusion component has a substantially uniform thickness.

3. The flat panel display assembly of claim 2, wherein the at least one diffusion component comprises a diffusion material and the diffusion layer comprises the diffusion material.

4. The flat panel display assembly of claim 3, further comprising a second substrate, the second substrate being substantially transparent, and the diffusion layer being attached to the second substrate.

5. The flat panel display assembly of claim 4, wherein the diffusion layer has a thickness substantially equal to the thickness of the at least one diffusion component.

6. The flat panel display assembly of claim 5, further comprising an imaging device located on a side of the diffusion layer opposite the plurality of light emitting components, the imaging device configured to generate an image with the light after propagating through the diffusion layer.

7. The flat panel display assembly of claim 6, wherein the imaging device comprises a liquid crystal display (LCD) panel.

8. The flat panel display assembly of claim 2, wherein the plurality of light emitting components include first and second light emitting components.

9. The flat panel display assembly of claim 8, wherein the at least one diffusion component is positioned between only the second light emitting components and the diffusion layer.

10. The flat panel display assembly of claim 9, wherein the first light emitting components comprise a first type of light emitting diodes (LEDs) and the second light emitting components comprise a second type of LEDs.

11. A flat panel display assembly comprising:
a substrate;
a plurality of light emitting components mounted to the substrate;
a plurality of diffusion components coupled to the substrate having a concave lower surface and an opposing convex upper surface such that the concave lower surface thereof is between at least one of the plurality of light emitting components and the convex upper surface thereof, wherein the plurality of diffusion components are configured to diffuse light emitted from the at least one of the plurality of light emitting components as the light propagates therethough; and
a diffusion layer coupled to the substrate such that the convex upper surface of each of the plurality of diffusion components is between the concave lower surface thereof and the diffusion layer and configured to further diffuse the light that propagates through the plurality of diffusion components.

12. The flat panel display assembly of claim 11, wherein the substrate comprises a printed circuit board (PCB) and the plurality of light emitting components comprise a plurality of light emitting diodes (LEDs).

13. The flat panel display assembly of claim 12, wherein the plurality of diffusion components comprises a diffusion material and the diffusion layer comprises the diffusion material.

14. The flat panel display assembly of claim 13, wherein the plurality of diffusion components have a component thickness and the diffusion layer has a layer thickness, the layer thickness being substantially equal to the component thickness.

15. The flat panel display assembly of claim 14, wherein the component thickness is substantially uniform.

16. A liquid crystal display (LCD) assembly comprising:
a printed circuit board (PCB);
a plurality of light emitting diodes (LEDs) mounted to the PCB;
a plurality of diffusion components coupled to the PCB having a concave lower surface and an opposing convex supper surface such that the concave lower surface thereof is between at least one of the LEDs and the convex upper surface thereof, wherein the plurality of diffusion components are configured to diffuse light emitted from the at least one of the plurality of light emitting components as the light propagates therethough; and
a diffusion layer coupled to the PCB such that the convex upper surface of each of the plurality of diffusion components is between the concave lower surface thereof and the diffusion layer and configured to further diffuse the light that propagates through the plurality of diffusion components; and
an LCD panel located on a side of the diffusion layer opposite the plurality of LEDs and being configured to generate an image with the light after propagating through the diffusion layer.

17. The LCD assembly of claim 16, wherein the plurality of diffusion components each have a substantially uniform thickness.

18. The LCD assembly of claim 17, wherein the plurality of diffusion components comprise a diffusion material and the diffusion layer comprises the diffusion material.

19. The LCD assembly of claim 18, wherein the diffusion layer has a thickness substantially equal to the thickness of the plurality of diffusion components.

20. The LCD assembly of claim 16, wherein the plurality of LEDs comprise a plurality of a first type of LEDs and a plurality of a second type of LEDs and the plurality of diffusion components are positioned between only the second type of LEDs and the diffusion layer.

* * * * *